March 17, 1931.  V. P. WILLIAMS  1,797,215
UNIVERSAL JOINT
Filed April 2, 1930  3 Sheets-Sheet 1
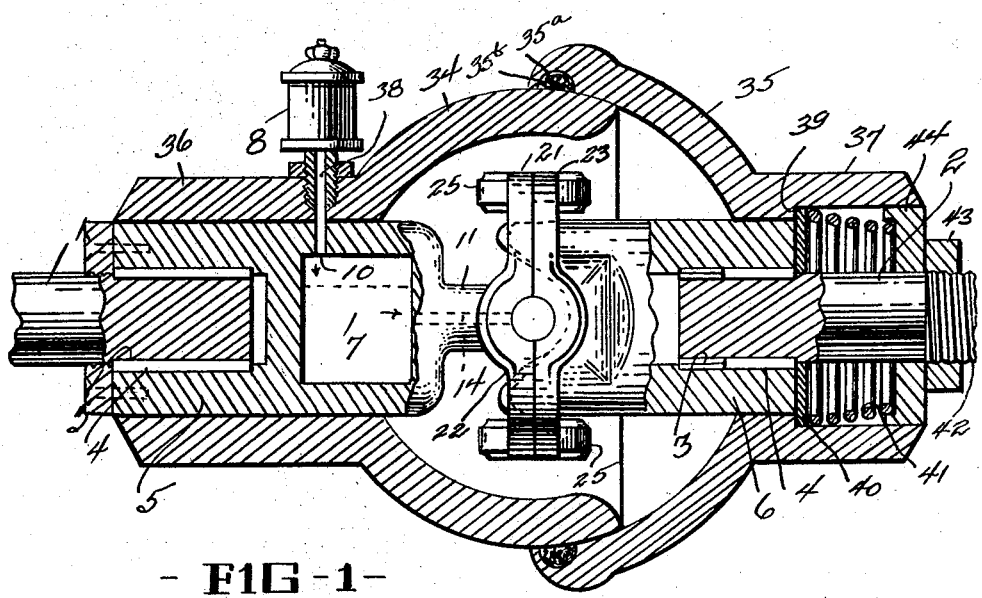
- FIG -1-
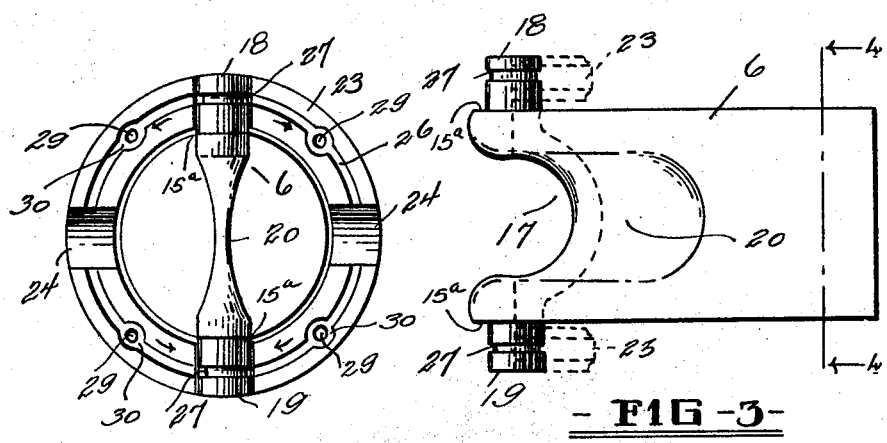
- FIG -2-   - FIG -3-
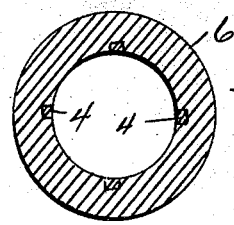
- FIG -4-
Inventor
VILLOR P. WILLIAMS,
By
Attorney

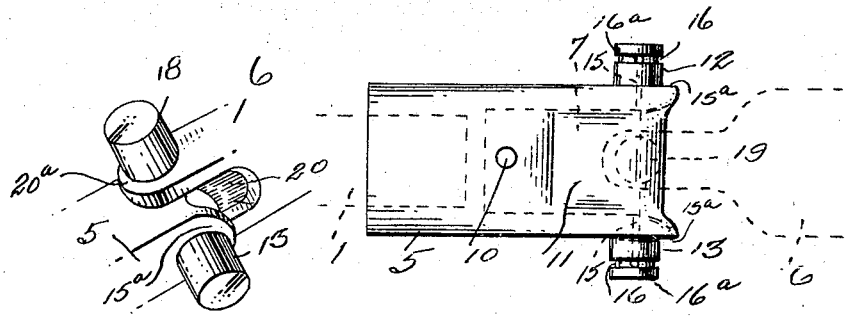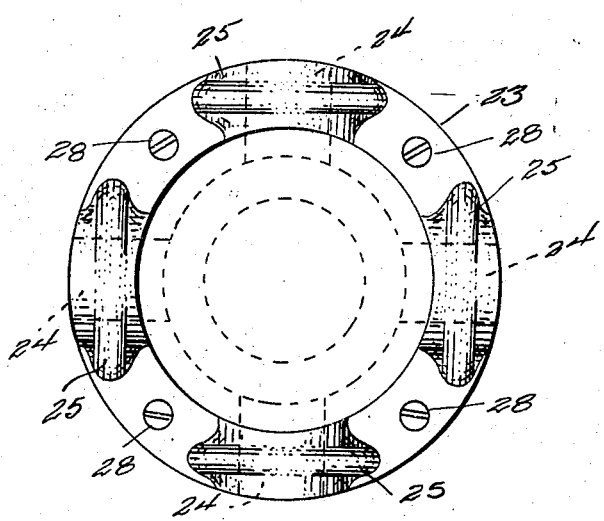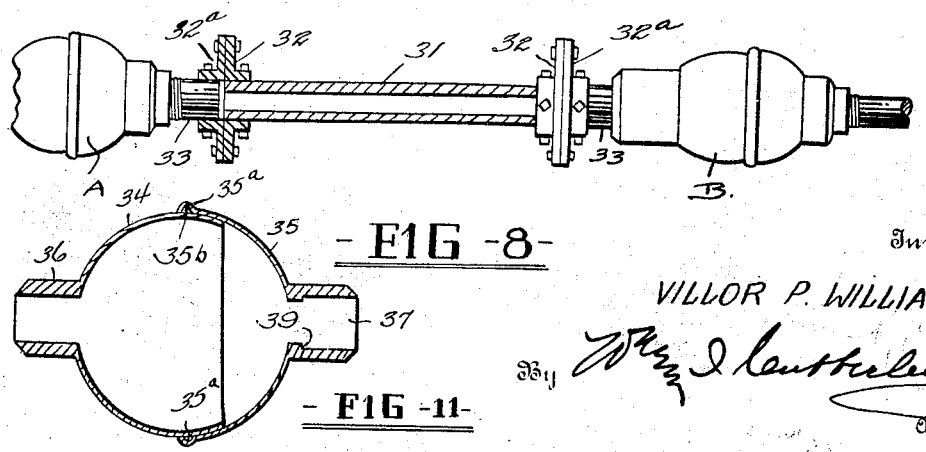

Inventor
VILLOR P. WILLIAMS,
By
Attorney

Patented Mar. 17, 1931

1,797,215

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

UNIVERSAL JOINT

Application filed April 2, 1930. Serial No. 441,146.

My present invention has reference, in its broad aspect, to improvements in universal joints, and more particularly it is my purpose to provide a joint of this general character which is stronger, lighter, more flexible, dust proof, and more readily lubricated, assembled and manufactured. My present universal joint is formed with unique and improved knuckles, carrying improved pins, which are retained in a ring formed in two identical sections which also constitute means for distributing lubricant to the pins and working parts. I provide improved means for reinforcing the knuckles at the weakest points, and the casing for the joint is greatly improved, lubricated and rendered more flexible and dust proof than other joints with which I am acquainted.

Certain universal joints with which I am acquainted are very difficult to keep properly lubricated, and their structure does not have the desired or necessary flexibility for present day motor vehicles; neither are these joints reinforced at the proper places, and it is not unusual to have the forks or Y's or knuckles and pins crack off at inopportune times and under the sudden and excessive loads imposed by present day traffic. My present universal joint is designed to eliminate these disadvantages, and provide a strong, light joint which needs little attention and which has the necessary flexibility for practical purposes.

Among the many advantages of my universal joint may be defined the following: First, the shell or casing of the joint is designed to give the maximum flexibility and means are provided whereby the two sections of the shell or casing are lubricated and packed to prevent entrance of dust to the joint parts; second, I utilize the principle that a hollow shafting is as strong and more rigid than a solid section of shafting; third, the hollow section of shafting which terminates in one of the knuckles is utilized as a reservoir for lubricant; fourth, the parts of each knuckle carrying the pins is uniquely reinforced so that cracking thereof is prevented and the joint rendered more serviceable and less liable to break; fifth, means are provided for attaining axial "give" or movement so that maximum power is transmitted by the joint, and undue stresses eliminated upon the pins, knuckles and ring, to the end that the joint is more flexible and better adapted for use in motor cars; sixth, the ring assembly is unique in that means are provided for distributing oil upon the working parts so that the joint is essentially self-lubricating; seventh, the pins are drilled to provide oil channels which communicate with the reservoir and with the ring so that oil is forced to the working parts automatically by centrifugal force; eighth, the knuckles have unique means for assembling the same on the ends of shafting; ninth, end thrust is eliminated and compensated for so that the only stresses operating on the joint parts are rotational or oscillating; tenth, but four or five screws or bolts are necessary to assemble the ring and retain the pins in the sections, and the joint may be assembled quickly and properly in but a short time, and; eleventh, parts are reduced to a minimum and these rendered as simple as possible so that the cost of the joint is less than others on the market.

Manifestly some of the parts of the joint may be modified as to size and shape to meet certain requirements of practice, and various details of construction may be also modified; therefore it is emphasized that the right to make such changes is reserved provided they fall within the spirit of the invention as hereinafter described in detail.

In the drawings wherein my universal joint is illustrated:—

Figure 1 is a side elevation of the assembly, partly in section to show the various parts;

Figure 2 is a view looking toward the type of knuckle shown in Figure 3, with one ring element or half-ring assembled thereon;

Figure 3 is a view of one of the joint knuckles or Y's;

Figure 4 is a view taken on the line 4—4 of Figure 3;

Figure 5 is a view of the other type of knuckle or the knuckle containing the oil reservoir;

Figure 6 is a conventional, perspective view showing the manner in which the knuckles are fitted together;

Figure 7 is a face view of the ring;

Figure 8 is a view of a conventional hollow vehicle driving shaft equipped with two universal joints of the type defined in my present application;

Fig. 11 shows a modification of the shell or housing of my device.

In the drawings wherein like characters of reference are used to designate like or similar parts throughout the several views:—

Figure 9:
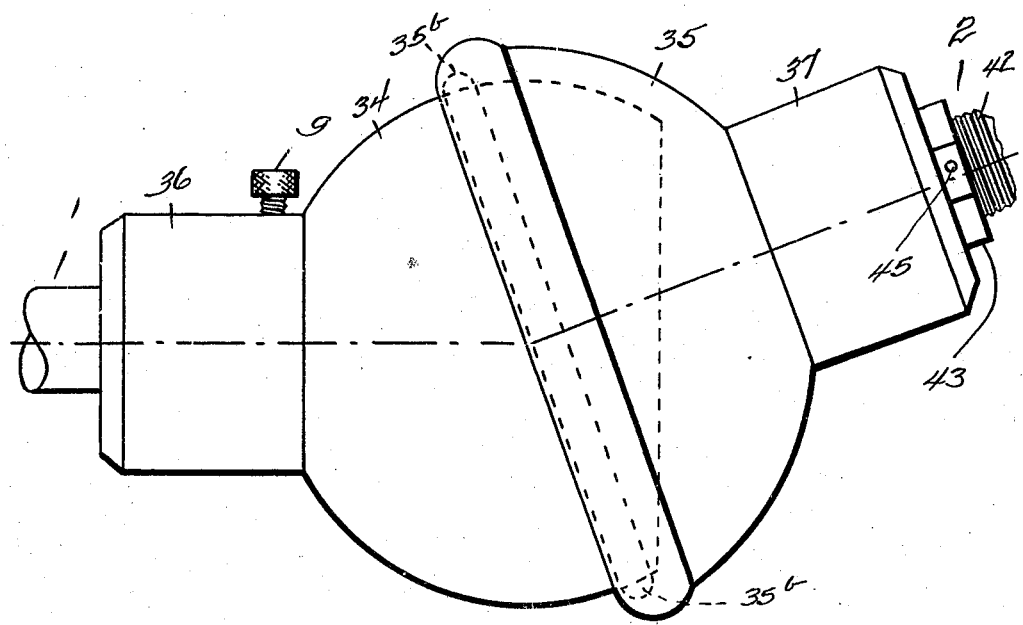
Figure 9 is a schematic view of my universal joint and illustrates its flexibility.
Figure 10:
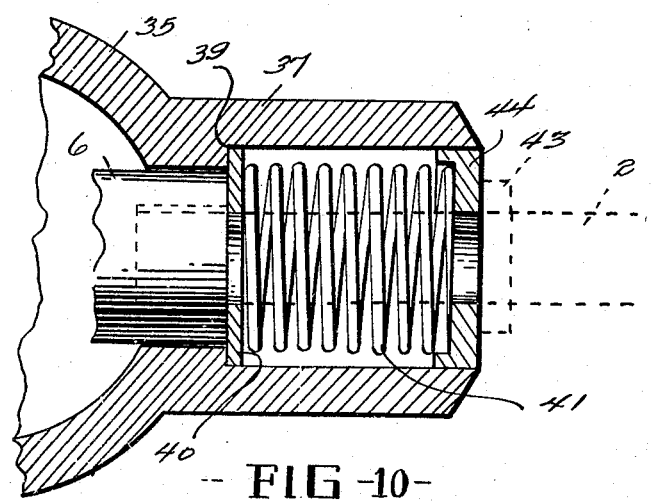
Figure 10 is a view of a modified form of my flexible connection for the joint, and wherein a spring is utilized.

The adjacent ends of two sections of shafting are designated (1) and (2); these may be the sections of a vehicle drive shaft or the like, and may be hollow or solid. They are connected by my universal joint. The end of each shaft is grooved as at (3) to receive splines (4) which connect them with the respective knuckles (5) and (6); section (2) is so splined to knuckle (6) that it is capable of some axial movement or give, as shown in Figure 1. Therefore in order to assemble my universal joint to connect the ends of two shaft sections it is merely necessary to spline the ends of the shaft sections to be received in the knuckles (5) and (6).

The universal joint knuckle (5) has a cavity or oil reservoir formed in its forward part and designated (7), the reservoir (7) is closed and access is gained either by means of an oil cup (8) or a cap screw (9)—see Figure 9—or other means plugging the hole (10) in the wall thereof. By cavitating the knuckle stress is taken up by two separate spaced walls so that not only is the weight decreased, but the knuckle is rendered more rigid by reason of the spacing of the walls of the cavity and less liable to break or crack. The knuckle (5) as shown in detail in Figure 5 is not bifurcated, but is medially restricted or pressed in as at (11) to reinforce the same beneath the pins (12) and (13); this restricted portion (11) has a central bore or channel (14) leading from the cavity or oil reservoir (7) to lateral bores (15) leading up into the pins (12) and (13). Each pin (12) and (13) has a shoulder (15a) to prevent seepage an annular groove (16) between its ends and nearer the outer end, while the lateral bores (15) communicate through ports (16a) so that oil or other lubricant is fed from the reservoir (7) to the grooves (16) in pins (12) and (13).

The other knuckle (6) is bifurcated or Y-shaped at its end, as indicated at (17) to bridge around and to either side of the end of knuckle (5) so that the pins (18) and (19), when the knuckles are assembled as shown in Figure 6, are in radial alignment positioned at the four quarters of a circle. The knuckle (6) has a web portion (20) which reinforces the knuckle so that it cannot crack under the strain exerted upon it, and a shoulder (20a) riding on the under side of the ring and preventing seepage of oil.

The knuckles are brought together after the manner shown in Figure 6, and are held together by the ring (21) which is formed of two similar sections or half-rings (22) and (23). The half-rings have four equidistant semicircular recesses (24) which form openings to receive the pins when the ring sections are assembled; and the material of the ring is reinforced and strengthened to compensate for these recesses as shown at (25). The inner face of each ring section has an annular groove (26); and these grooves in assembly register to form a continuous channel which also registers with the grooves (16) and (27) in pins (12) and (13) and (18) and (19) respectively so that oil or other lubricant entering grooves (16) of pins (12) and (13) passes about and within the channel formed by grooves (26) to enter the grooves (27) in pins (18) and (19) of knuckle (6) thereby lubricating the pins. The half-rings are held together by screws or bolts (28) passing through openings (29) therein, and the openings are countersunk or reamed out as at (30) to permit the oil in the channel to pass the bolts or screws.

In practice a drive shaft of an automobile is assembled with two universal joints after the manner shown in Figure 8, wherein a hollow shaft (31) has a flanged collar (32) at each end, which is joined by bolts to a flanged collar (32a) on each end of the short shafts (33) of the universal joints A and B.

Disposed about my universal joint is a unique shell or casing formed of sections (34) and (35); both of which follow the spherical form in contour and may be formed of sheet metal as shown in Figure 11. The section (34) is hollow and extended to more than half of a sphere, while the section (35) fits over the section (34) and is less than a half of a sphere or cup-shaped. Thus one section telescopes within the other, and the section (35) has a groove 35a at its edge where it overlaps the section (34) wherein suitable lubricated packing 35b is contained to form a dust proof joint and to lubricate the wiping surfaces of the sections where they meet. Each section of the shell has a collar portion, respectively designated (36) and (37) the collars of the sheet metal type being of greater thickness. The collar portions fit on the shanks of the knuckles, and collar portion (36) carries the grease cup or plug or the like which closes the port (38) leading to the opening or hole (10) in the wall of knuckle (5) so that the cavity in the knuckle can be filled with oil or grease. The collar portion (37) of section (35) is internally cut away or enlarged to form a shoulder (39) against which is seated a suitable packing washer (40). Within the collar portion (37) is a coil spring (41) which is about the end of shaft section (2) and which abuts either against the shoulder (39) or the packing washer (40) as shown. The shaft section (2) is threaded as at (42) at a point removed from its end, on which is carried a locking and adjusting nut (43). In advance of the screw (43) is a flanged washer (44) which may also be integral therewith against which the other end of the spring (41) seats. Since the shaft section (2) is so splined with respect to the joint that it is capable of limited axial "give" or movement; this movement is against the force of coil spring (41), and the tension may be adjusted by regulating the position of nut (43) on shaft (2) so that a yielding connection capable of axial give is provided between the shaft section (2) and the universal joint. In Figure (10) the coil spring (41) is shown as having its several convolutions all of the same diameter, while in Figure (1) a conical spring is used, and in Figure 9 the nut (43) is shown as pinned in position as at (45), although a supplementary lock nut may be used to fix the position of nut (41) when it has been adjusted.

It is believed that the operation of my universal joint will be apparent from the foregoing, but it is pointed out that the rapid rotation and oscillation of the parts will induce sufficient centrifugal force to cause oil to pass from the reservoir in knuckle (5) out through the bores to the annular channel in the ring (21) to lubricate all the working parts and pins. It is furthermore emphasized that my joint is exceedingly flexible, and strong, and that the knuckles are reinforced at the places where reinforcement is most needed. In fact, the flexibility is such that an angle in excess of 40° can be obtained. On the other hand the casing sections are self lubricating and unique in construction, and are dust proof and capable of wide flexibility to compensate for the movement of the joint, while this flexibility is added to by providing means for axial give, and adjustment of the give or movement through the instrumentality of spring (41) and nut (43). The parts are simple in construction and easily manufactured and the joint may be quickly taken apart or assembled on power transmission elements; it is dust proof, automatically lubricated, and designed to give the maximum efficiency with the least number of moving parts.

While the combination and arrangement of parts heretofore described constitutes the preferred embodiment of my invention, it is desired to emphasize that interpretation of the scope of my invention should only be conclusive when made in the light of the subjoined claims.

I claim:
1. A universal joint comprising a pair of knuckles, one of which is bifurcated at its end and the other knuckle having formed in an integral part thereof a closed reservoir for lubricant, said knuckles carrying radial pins at their ends extending in opposite directions, the latter knuckle being receivable in the space between the arms formed by the bifurcation in the other knuckle to obtain a maximum flexibility in excess of 40° and a ring in which the pins of the knuckles are journalled to directly drive the ring through the pins.

2. A universal joint comprising a pair of knuckles, one of which is forked to bridge the other, each knuckle having pins and the pins being respectively positioned at points coincident with the four quarters of a circle when the knuckles are assembled together, the other knuckle being formed with a closed cavity the walls of which lend to greater rigidity and to provide a reservoir for lubricant, a ring connecting the pins integrally formed thereon, and means for delivering lubricant from the cavity to all of the pins at the same time and simultaneously through centrifugal force when the joint is in operation.

3. A universal joint comprising knuckles having pins and a ring joining the pins; a casing for the joint formed with overlapping, substantially semi-spherical, hollow sections, a collar on each section, one collar being internally reduced to form a shoulder, and spring means in conjunction with one of the knuckles and bearing against the shoulder to permit slight relative movement of the knuckles with the shaft.

4. A universal joint comprising knuckles having pins and a ring joining the pins; a casing for the joint formed with overlapping, substantially semi-spherical, hollow sections, a collar on each section to receive the respective knuckles therethrough, and one collar being internally reduced to form an annular shoulder to receive thereagainst means for yieldingly resisting movement of the knuckle with respect to the shaft.

5. A universal joint comprising a casing, collars formed on the casing, and knuckles extending through the collars, pins on the knuckles, and the pins on each knuckle being an integral casting with the shank of the knuckle, the shank of each knuckle being bored and grooved to spline the end of a shaft therein, the end of one knuckle being concave to bridge the end of the other knuckle, and provided with a reinforcing web, and the other knuckle being formed with a cavity constituting a reservoir for lubricant, and a ring connecting the pins of the knuckles.

In testimony whereof, I affix my signature hereunto.

VILLOR P. WILLIAMS.